US006362753B1

(12) United States Patent
Kasahara

(10) Patent No.: US 6,362,753 B1
(45) Date of Patent: Mar. 26, 2002

(54) VIDEO DATA ENCODER AND METHOD OF ENCODING VIDEO DATA

(75) Inventor: Tsuyoshi Kasahara, Fussa (JP)

(73) Assignee: Casio Computer Co., Ltd., Tokyo (JP)

(*) Notice: Subject to any disclaimer, the term of this patent is extended or adjusted under 35 U.S.C. 154(b) by 0 days.

(21) Appl. No.: 09/639,923

(22) Filed: Aug. 16, 2000

(30) Foreign Application Priority Data

Sep. 1, 1999 (JP) ............................................. 11-247729

(51) Int. Cl.[7] ................................................. H03M 7/00
(52) U.S. Cl. ........................................ 341/50; 348/403
(58) Field of Search ............................. 341/50, 51, 52; 348/403, 412, 405, 409

(56) References Cited

U.S. PATENT DOCUMENTS

| | | | | |
|---|---|---|---|---|
| 4,984,076 A | * | 1/1991 | Watanabe et al. | 358/133 |
| 5,260,808 A | * | 11/1993 | Fujii | 358/458 |
| 5,479,212 A | * | 12/1995 | Kurobe et al. | 348/409 |
| 5,856,848 A | * | 1/1999 | Fujiwara et al. | 348/416 |
| 5,859,668 A | * | 1/1999 | Aono et al. | 348/416 |
| 6,266,447 B1 | * | 7/2001 | Hoshi et al. | 382/236 |

FOREIGN PATENT DOCUMENTS

| | | | | |
|---|---|---|---|---|
| EP | 0 544 080 | 6/1993 | ............ | H04N/7/13 |
| EP | 0 859 519 | 8/1998 | ............ | H04N/7/34 |
| JP | 41119600 A | * 7/1999 | ............ | H03M/7/40 |

OTHER PUBLICATIONS

A. Puri et al: "Improvements in DCT Based Video Coding", Proceedings of the SPIE, Feb. 12, 1997, XP000199866, paragraphs 3.1.1!, 3.1.2!.

M.S. Shen et al: "A Method of Adaptive Prediction in the Transformation Domain", ITG–Fachberichte, DE, VDE Verlag, Berlin, vol. 143, Sep. 10, 1997, pp. 709–712, XP000199865, ISSN: 0932–6022, p. 710, left–hand column, paragraph 3.

* cited by examiner

Primary Examiner—Peguy JeanPierre
(74) Attorney, Agent, or Firm—Frishauf, Holtz, Goodman, Langer & Chick, P.C.

(57) ABSTRACT

Determining whether AC component prediction is effective or not based on the sum of absolute values of unpredicted AC components ($\Sigma mS0$) before calculating prediction error S in the AC components. If $\Sigma mS0$ is smaller than a predetermined threshold $\theta 1$, it is determined that the prediction will be ineffective. In this case, the unpredicted AC components are encoded directly without calculating the prediction error S.

6 Claims, 9 Drawing Sheets

FIG.7
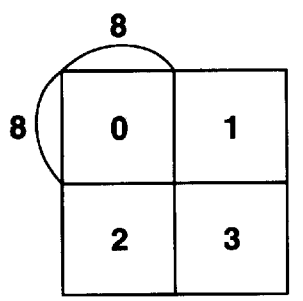
BRIGHTNESS
(Y COMPONENTS)
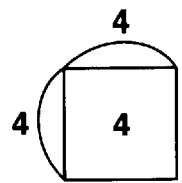
CHROMINANCE
SIGNAL
(Cd COMPONENTS)
CHORMINANCE
SIGNAL
(Cr COMPONENTS)
MACROBLOCKS IN DETAIL

COMPONENT ESTIMATION(AC VS.DC)
(8×8DCT)

VIDEO DATA ENCODER AND METHOD OF ENCODING VIDEO DATA

BACKGROUND OF THE INVENTION

1. Field of the Invention

The present invention relates to a video data encoder and method of encoding the video data, more particularly to a technique for raising the compression efficiency in intraframe coding for motion estimation with using discrete cosine transform.

2. Description of the Related Art

Video data encoding (coding) technology has been improved with wide industry participation, and various global standards for video data encoding for multimedia contents have been established. For example, H.263 is an international standard for video data encoding suitable for transmitting video data file, and MPEG (Moving Picture Experts Group) is another one suitable for storing video data files. Each of those techniques employs unique encoding algorithm(s) for appropriate bit rate suitable for the purpose.

For example, a coding technique employed in MPEG-4 being standardized internationally, is hybrid of two data coding techniques, discrete cosine transform (DCT) and estimation with motion compensation (MC). Those coding techniques work as a basic algorithm for video data coding in MPEG-4.

FIG. 6 is a block diagram for explaining typical encoding process in MPEG-4. There are two approaches for video data encoding: intraframe coding and interframe coding. The intraframe coding is a way to compress video data by referencing data in each frame, while the interframe coding refers differences between frames for compression.

The first step of the intraframe coding is to divide video object plane (VOD) into macroblocks by a divider 6a. A macroblock is a unit for intraframe coding process. FIG. 7 shows the structure of a macroblock. As shown in FIG. 7, a macroblock contains blocks of data from the luminance component (Y component) and from the chrominance components (Cb and Cr components). The structure shown in FIG. 7 is based on one of the chrominance formats called "4:2:0 format" which includes four luminance blocks and two chrominance blocks. Each block is subjected to DCT by a discrete cosine transformer 6d, and thus transformed blocks are quantized by a quantizer 6e. Thus quantized data (DCT coefficient and amplitude) are subjected to variable-length coding by a variable-length coder 6f. Finally, resultant codes are output to be transmitted or the like. On the contrary, the quantized blocks are subjected to inverse quantization by an inverse quantizer 6g for restoring frame to be used as source frame for next estimation. Further, the DCT coefficient is subjected inverse DCT by an inverse discrete cosine transformer 6h. Thus restored VOP is transferred to a frame memory 6j via an addition circuit 6i.

In interframe coding on the contrary, a motion detecting method such as block matching is carried out against a VOP adjoining to a VOP having target macroblock to detect estimative macroblock having least difference from the target macroblock by a motion vector detector 6b. A signal representing motion of the estimative macroblock having the least difference is called motion vector. And a frame to which referred for generating the estimative macroblock is called a reference VOP. The motion compensation is carried out against the reference VOP stored in a frame memory 6j based on the detected motion vector to obtain an appropriate estimative macroblock. A subtraction circuit 6c obtains difference between the target macroblock and the detected estimative macroblock. Thus obtained difference signal is subjected to DCT by the discrete cosine transformer 6d, and DCT coefficient is quantized by the quantizer 6e. The quantized DCT coefficient is subjected to variable-length coding by the variable-length coder 6f together with the motion vector and amplitude.

Details of DCT will now be described. The DCT is one of Fourier Transform. The DCT transforms 2 dimensional image into 2 dimensional frequency, and the frequencies are divided into conspicuous low frequency components and inconspicuous high frequency components. Moreover, it is able to obtain ubiquitous information. The following expression 1 represents 2D DCT on 8×8 blocks, and expression 2 represents inverse DCT.

$$F(u, v) = (1/4)C(u)C(v)\sum_{i=0}^{7}\sum_{j=0}^{7} f(i, j)\cos(2i+1)u\pi / \qquad \text{EXPRESSION 1}$$

$$16\cos(2j+1)v\pi/16$$

$$f(u, v) = (1/4)\sum_{i=0}^{7}\sum_{j=0}^{7} C(u)C(v)F(u, v)\cos(2i+1)u\pi / \qquad \text{EXPRESSION 2}$$

$$16\cos(2j+1)v\pi/16$$

where $C(u)=1/\sqrt{2}(u=0)$
$C(u)=1$ $(u\neq 0)$
$C(v)=1\sqrt{2}(v=0)$
$C(v)=1(v\neq 0)$
IDCT (i, j): pixel values
DCT (u, v): DCT coefficients FIG. 8 is a diagram showing a target block X and its peripheral adjoining blocks A, B, and C. Each of squares in each block represents a DCT coefficient. DCT coefficients represented by left upper squares in the blocks are direct current (DC) components, while the others are alternating current (AC) components. MPEG-4 has an advantage over MPEG-2 because MPEG-4 realizes improved efficiency for coding intra-type blocks by adaptively coding both quantized DC and AC components with a predictive coding technique, while MPEG-2 features differential coding to be applied only to DC components in intra-type blocks.

A DCT coefficient memory 6k stores quantized DCT coefficients of the reference block (DC components, and AC components for a first horizontal row or a first vertical column) as predicted values. Of the predicted values, values for DC components are subjected to predictive coding and output, while it is determined whether predictive coding should be applied to the AC components or not (a prediction selector 6m).

In a case whether the predictive coding should be applied to the AC components, a switch SW1 is turned on, so that a subtraction circuit 61 calculates difference (prediction error) between the predicted values in the memory 6k and the quantized AC components and variable-length coding is carried out by the variable-length coder 6f. On the contrary, if the predictive coding is ineffective, the switch SW1 is turned off, so that the variable-length coding performed by the variable-length coder 6f is just applied to the quantized AC components.

An operation of the conventional intraframe coding will now be described.

FIG. 9 is a flowchart for explaining process flow of the conventional intraframe coding. In the following explanation, for example, X(i, j) represents DCT coefficient in the block X (wherein i represents vertical components, j represents horizontal components; i, j=0, 1, 2, ..., 7).

Input video data (VOP) are divided into unit macroblocks. Each of the macroblocks are subjected to DCT to be quantized (step A1). Then, sum of absolute values S0 of the AC components of the DCT coefficients in the first vertical column of the first horizontal row is calculated (step A2). The following expression 3 represents the sum of the absolute values S0.

$$S0=\Sigma|X(i,0)| \text{ or } \Sigma|X(0,j)| (i, j=1, 2, \ldots, 7) \qquad \text{EXPRESSION 3}$$

Then, the sum total ($\Sigma mS0$) of the sums of absolute values S0 of the AC components for all blocks (Y, Cb, and Cr components) in the macroblocks is calculated, and the result is stored on a work area in a RAM 8.

Then, the DC components in the quntized DCT coefficients are coded by the prediction coding. Prediction values of the DC components are adaptively selected based on inclines between horizontal and vertical DC components among blocks around the target block.

The following expression 4 represents prediction value X' (0, 0) of the DC components in a block X. The memory 6k stores the determined prediction value X' (steps A3 to A5).

$$\text{if } (|A(0,0)-B(0,0)|<|B(0,0)-C(0,0)|$$
$$\text{then } X'(0,0)=C(0,0)$$
$$\text{else } X'(0,0)=A(0,0) \qquad \text{EXPRESSION 4}$$

where A (0, 0): DC components in block A
B (0, 0): DC components in block B
C (0, 0): DC components in block C
X (0, 0): DC components in block X In a case where the prediction value of the DC components is C (0, 0), the AC components X (0, j)(j=1, 2, ..., 7; hatched portion HX in FIG. 8) for the first horizontal line in the target block X are coded by the prediction coding. In this case, the prediction value is the AC components C(0, j)(j=1, 2, ..., 7; hatched portion HC in FIG. 8) for the first horizontal line in the block C, which is stored in the memory 6k. The following expression 7 represents prediction error (PE) in the AC components.

$$PE=X(0,j)-C(0,j) \qquad \text{EXPRESSION 7}$$

Since quantization scaling for the AC components among the blocks may be uneven sometimes as well as a case of the DC components, the prediction values are normalized.

In a case where the prediction error in the AC components is larger than unpredicted AC components, the unpredicted AC components are coded directly without prediction. The prediction selector 6m determines whether AC component prediction should be applied to each macroblock. The determination is carried out by comparing $\Sigma mS0$ (see expression 3) with $\Sigma mS$, that is, comparing the sum of absolute values of the unpredicted AC components (in first horizontal line or the first vertical column) of all blocks (Y, Cb, and Cr components) in the target block X with the sum of absolute values of the prediction errors in the AC components. The following expression 8 represents the sum S of absolute values of the prediction errors in the AC components in each block.

$$S=\Sigma|X(i,0)-A(i,0)| \text{ or } \Sigma|X(0,j)-C(0,j)|$$
$$(i,j=1, 2, \ldots, 7) \qquad \text{EXPRESSION 8}$$

For determining effectiveness of the AC component prediction, the sum total $\Sigma mS$ over all blocks (Y, Cb, and Cr components) in the target block whose sum S of absolute values of prediction errors in the AC components is calculated (step A7), and the sum of absolute values of the prediction errors ($\Sigma mS$) is compared with the sum of absolute values in the unpredicted AC components ($\Sigma mS0$) (step A8). The comparison is carried out in accordance with the following expression 9.

$$\Sigma mS<\Sigma mS0 \qquad \text{EXPRESSION 9}$$

If the inequality expression 9 is satisfied (YES at step A8), the switch SW1 is turned on, thus the prediction coding is allowed, that is, the prediction errors in the AC components are subjected to variable-length coding (step A9). If the inequality expression 9 is not satisfied (NO at step A8), the switch SW1 is turned off, thus the prediction coding is not allowed, that is, the unpredicted AC components are subjected to the variable-length coding (step A10).

Accordingly, $\Sigma mS$ (the sum of absolute values of prediction errors in the AC components) and $\Sigma mS0$ (the sum of absolute values of the AC components) are calculated and compared with each other to determine necessity of the AC component prediction through the conventional coding process.

Since the conventional technique requires the determination whether the prediction is effective or not, it is necessary to perform calculations to find out$\Sigma mS$ (prediction errors in the AC components) over every macroblocks even if it is obvious that the prediction is ineffective in a case where the macroblocks have a few AC blocks, for example, the VOP represents the sky or the ground whose tone is almost uniform. Such the extra calculations causes redundancy in the coding process.

SUMMARY OF THE INVENTION

The present invention has been made in consideration of the above. It is an object of the present invention to provide a video data encoder and a method and a recording medium which realizes high speed efficient video data encoding in the prediction coding by which both DC components and AC components in DCT coefficients are adaptively predicted, with eliminating redundant tasks in prediction coding for AC components.

According to the present invention, a video data encoder which adaptively encodes both direct current components and alternating current components of discrete cosine transform coefficients in target blocks by prediction coding, comprises:

a determination unit which determines whether the prediction for the alternating current components in the target block is effective or not; and an encoder which encodes the alternating current components without calculating prediction error in the alternating current components in the target blocks when said determination unit determines that the prediction is ineffective.

This structure realizes high speed efficient coding because of less calculation in coding when AC component prediction is obviously ineffective. More precisely, the encoder does not calculate prediction error in AC components in blocks which represents almost uniform images such as the sky or the ground.

BRIEF DESCRIPTION OF THE DRAWINGS

These objects and other objects and advantages of the present invention will become more apparent upon reading of the following detailed description and the accompanying drawings in which:

FIG. 7 is a diagram shoring the block configuration in a macroblock;

DETAILED DESCRIPTION OF THE PREFERRED EMBODIMENTS

Embodiments of the video data encoder according to the present invention will now be described with reference to FIGS. 1 to 5.

First Embodiment

A video data encoder 1 according to a first embodiment will now be described with reference to FIGS. 1 to 3.

Figure 1:
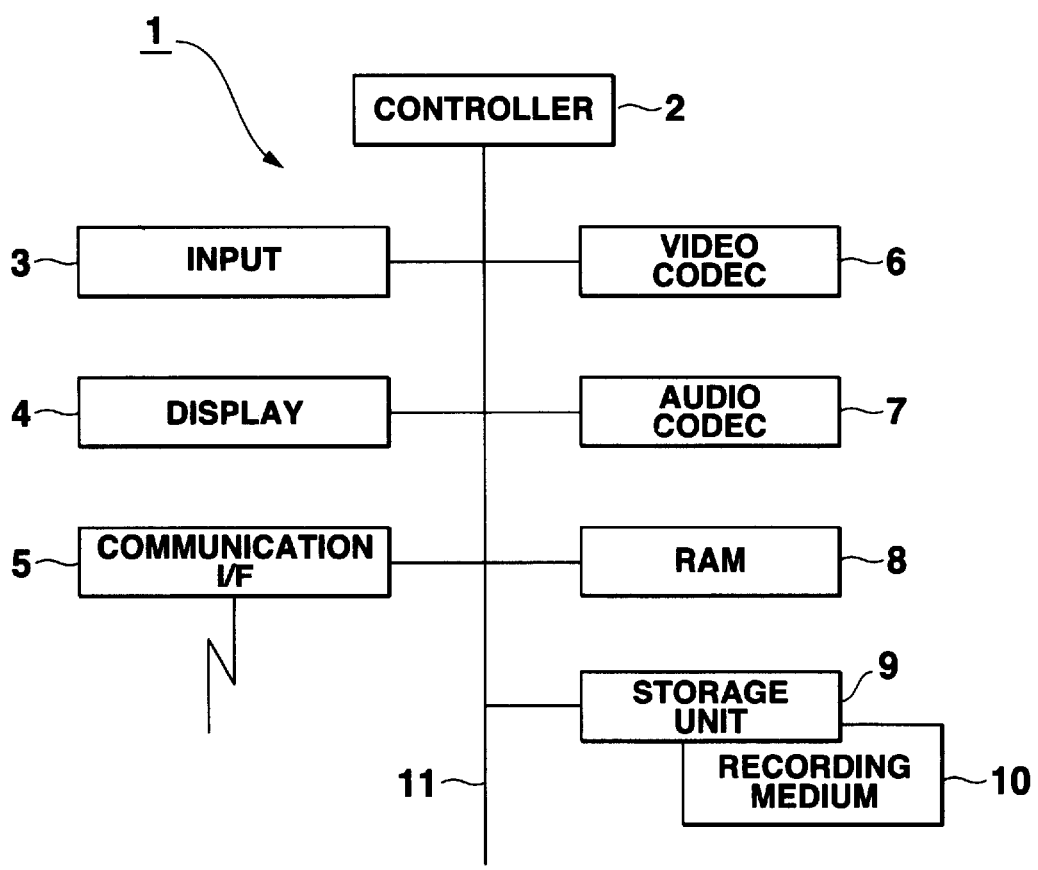
FIG. 1 is a diagram showing the circuit structure in a video data encoder.

FIG. 1 is a diagram schematically showing the structure in the video data encoder 1.

As shown in FIG. 1, the video data encoder 1 comprises a controller 2, an input 3, a display 4, a communication interface (I/F) 5, a video CODEC 6, an audio CODEC 7, a RAM (Random Access Memory) 8, and a storage unit 9 which are interconnected by a bus 11. And, the storage unit 9 accepts a recording medium 10.

The controller 2 selects appropriate application programs from various application programs being compatible with the video data encoder 1 stored in the storage unit 9, and transfers the selected programs and instructions and data input through the input 3 to a work area in the RAM 8. The controller 2 executes the programs in the RAM 8, and performs various tasks in accordance with the running program. Results are stored in the RAM 8 while being displayed on the display unit 4. The results in the RAM 8 will be transferred to appropriate directory in the storage unit 9 in accordance with the user's instruction input through the input 3.

For video data coding, the controller 2 multiplexes two sets of coded data: a coded video data set processed by the video CODEC 6 and a coded audio data set processed by the audio CODEC 7. After the multiplexing, one line of bit-stream data is generated. The bit-stream data set is stored on the recording medium 10 in the storage unit 9, or output to an external device via the communication I/F 5.

For decoding coded video data, the controller 2 extracts video data and audio data separately from bit-stream data set which is read out from the storage medium 10 in the storage unit 9 or given by the external device via the communication I/F 5. The extracted video data set and audio data set are transferred to the video CODEC 6 and the audio CODEC 7 respectively.

The input 3 includes a keyboard equipped with cursor keys, numeric keys, various function keys, and the like, and a pointing device such as a mouse. The input 3 transmits signals generated in response to key depression and mouse operation to the controller 2. The input 3 may include a digitizer covering the display 4. The digitizer detects positions where a pen touches by sensing electromagnetic changes, magnetostriction changes, pressure changes, or the like, thus input data. The input data are transferred to the controller 2.

The display unit 4 is a CRT (Cathode Ray Tube) display, a liquid crystal display, or the like. The display unit 4 is controlled under a display control signal supplied from the controller 2, and displays video images represented by the video data decoded by the video CODEC 6.

The communication I/F 5 may be a modem (modulator/demodulator), a terminal adaptor (TA), a router, or the like which controls communication with external devices via communication network such as PSTN (Public Switched Telephone Network), ISDN (Integrated Services Digital Network), a leased line, and the like.

The video CODEC 6 encodes and decodes video data and the like stored in the recording medium 10 in the storage unit 9 or given by a video camera (not shown).

Figure 6:
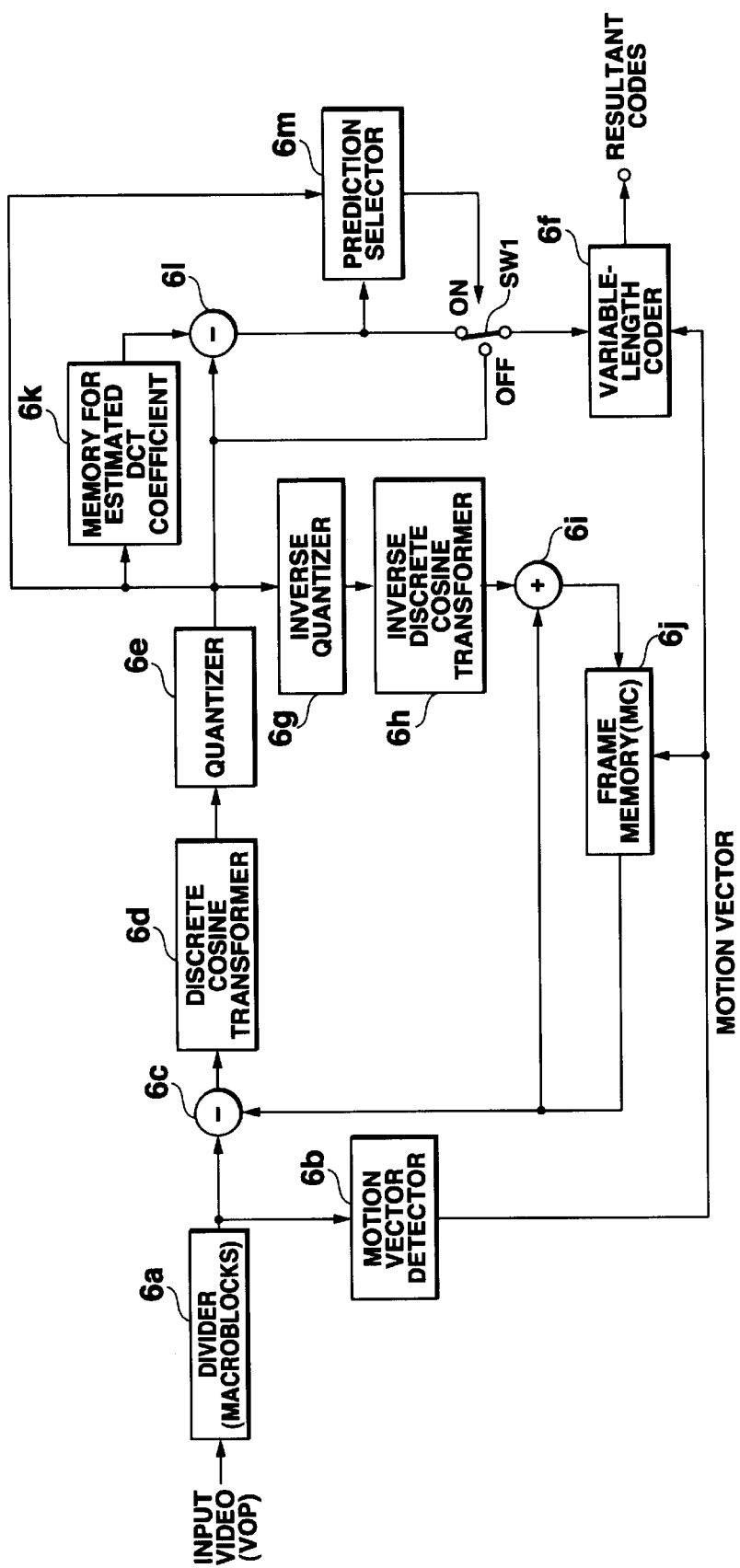
FIG. 6 is a block diagram for explaining coding process.
Figure 8:
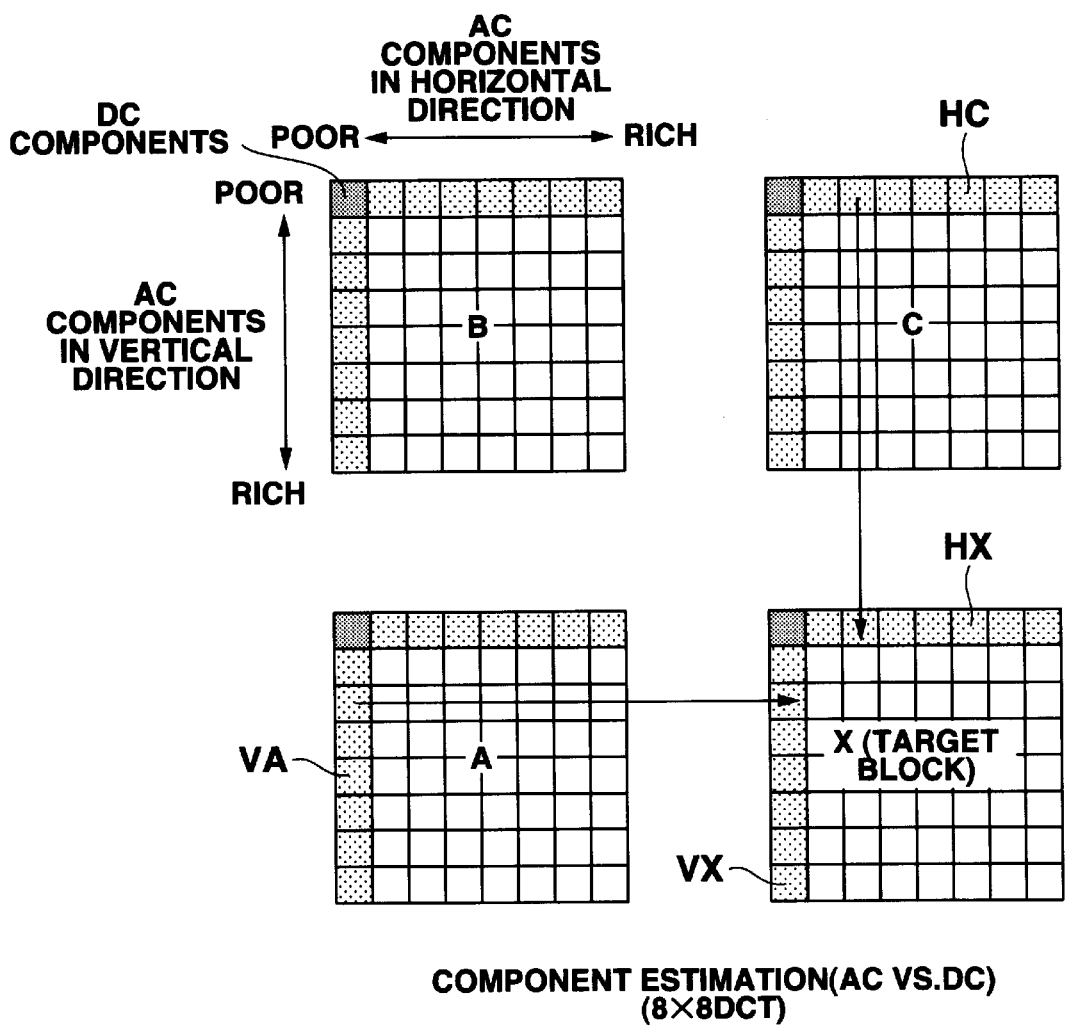
FIG. 8 is a diagram shoring a target block X and its peripheral blocks A, B and C.

The coding process in the present invention is almost the same as the aforementioned conventional technique except process for determining whether adapting prediction or not for coding AC components of DCT coefficients. Therefore, detailed description of the coding process will be simplified with applying reference characters used in FIG. 6 to the same or similar components of the present invention. Since macroblock structure and AC/DC components of DCT coefficients to be processed in the present invention are the same as those described above as prior art shown in FIGS. 7 and 8, the following explanation will uses the same reference characters and expressions shown in FIGS. 7 and 8.

The conventional process for determining whether prediction before coding is effective or not is carried out in the following manner: compare the sum of absolute value of unpredicted AC components ($\Sigma mS0$) with the sum of absolute value of prediction error in AC components ($\Sigma mS$) on the first vertical column or first horizontal line in a target block; and determines that the prediction is effective when $\Sigma mS0$ is larger than $\Sigma mS$.

In a first embodiment of the present invention, effectiveness of prediction will be determined based on $\Sigma mS0$ before calculating prediction error S in the AC components. More precisely, if $\Sigma mS0$ is smaller than threshold $\theta 1$ stored in a condition storage unit (not shown) prepared in the prediction selector 6m, it is determined that prediction is ineffective. In this case, the switch SW1 is turned off, thus, the calculation for obtaining prediction error S will be skipped and unpredicted AC components will be encoded directly.

The video CODEC 6 also decodes encoded video data, and outputs decoded video data.

The audio CODEC 7 encodes sound data to be affixed to video data encoded by the video CODEC 6, and transfers the encoded sound data to the controller 2. The audio CODEC 7 also decodes encoded sound data separated from the encoded video data.

The RAM 8 has the work area for storing selected application programs, input instructions, input data, results, and the like.

The storage unit 9 has the recording medium 10 on which programs, data, and the like are previously stored. The recording medium 10 may be a magnetic medium, an optical medium, or a semiconductor memory. The recording medium 10 maybe a fixed medium in the storage unit 9 or a removable medium to be detachably applied to the storage unit 9. The recording medium 10 stores data and the like processed by the application programs being compatible with the video data encoder 1.

Programs, data, and the like to be stored on the recording medium 10 may be received from the other device via the communication network or the like. Or, the other device being connected to the video encoder 1 via the communication I/F 5 may be equipped with a storage unit including the recording medium 10, and the video data encoder 1 may fetches the programs, data, and the like stored in the recording medium via the communication I/F 5.

Operations of the video encoder 1 will now be described.

Figure 2:
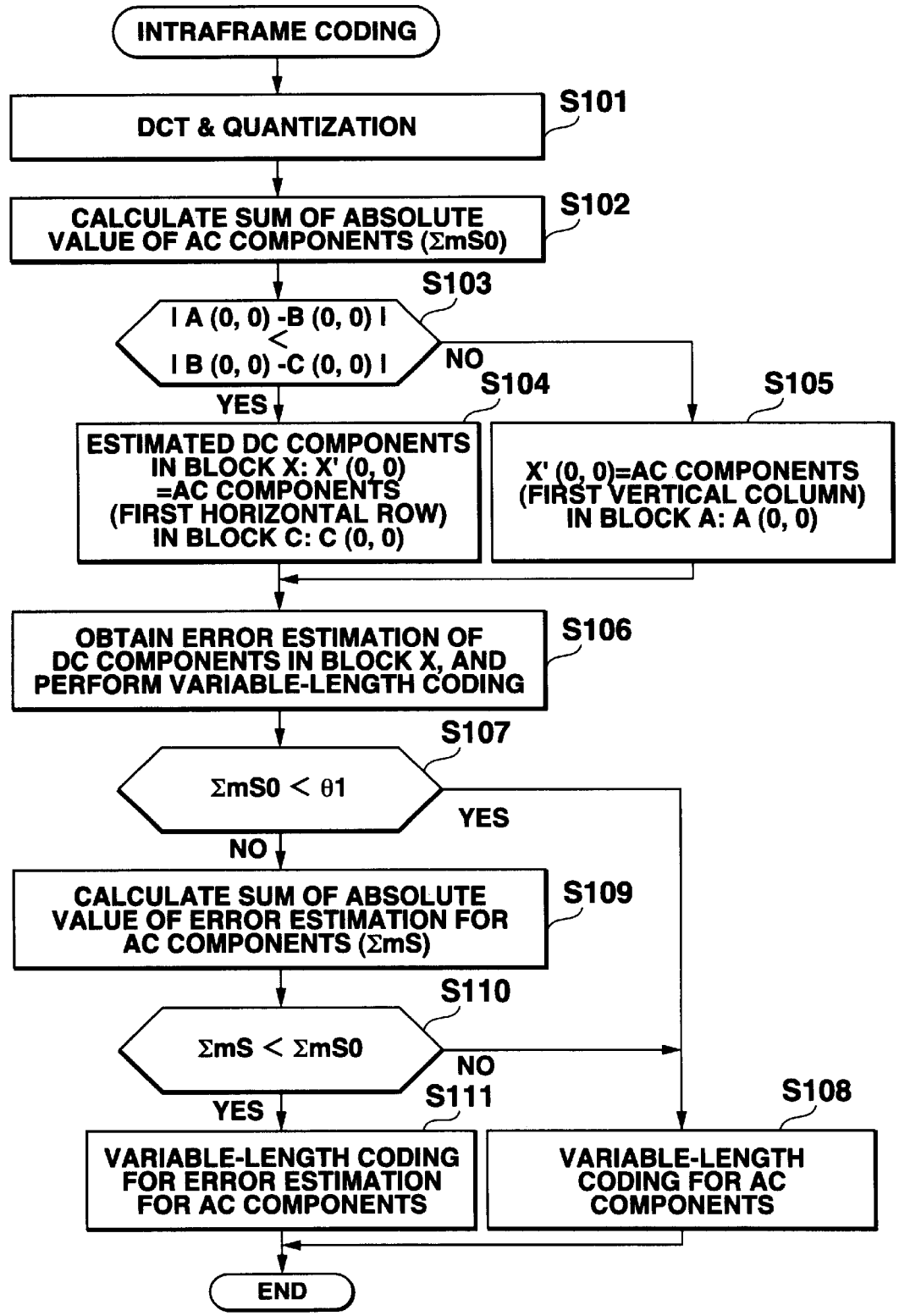
FIG. 2 is a flowchart for explaining intraframe coding according to a first embodiment.

FIG. 2 is a flowchart for explaining intraframe encoding process to be executed through the first embodiment.

For the intraframe encoding, a program specialized for the intraframe encoding has been prepared in the recording medium 10. The controller 2 reads out the program from the recording medium 10 to develop it in the RAM 8. The controller 2 controls the video CODEC 6 in accordance with the program developed in the RAM 8 to perform the intraframe encoding.

First, input video data set (VOP: video object plane) is divided into unit macroblocks by the divider 6a. Then the video CODEC 6 performs intraframe encoding in the manner described detail in Prior Art (see FIG. 9): processing every microblock with DCT (by the discrete cosine transformer 6d; step S101); quantization by the quantizer 6e; and calculating ΣmS0 (the sum of absolute value of AC components in DCT coefficients on the first horizontal line or first vertical column) in every blocks (Y, Cb, and Cr components) in the target block (step S102).

Then, the video CODEC 6 encodes DC components of the quantized DCT coefficients with prediction coding (steps S103 to S106). Since this process is the same as the conventional one (steps A3 to A6 shown in FIG. 9), detailed description will be omitted.

After the prediction coding for the DC components completes, the video CODEC 6 starts to encode AC components. In the first embodiment, a condition for determining whether prediction is effective or not, is examined before calculating ΣmS0 (prediction error in AC components). In this case, the condition is whether ΣmS0 (the sum of absolute value of AC components on the first vertical column or first horizontal line in the target block) is smaller than threshold θ1 or not. That is, it is determined whether the following expression 10 is satisfied or not (step S107).

$$\Sigma mS0 < \theta 1 \qquad \text{EXPRESSION 10}$$

θ1 represents a threshold value which is appropriate for desired image quality or process speed for coding. The threshold is stored in a condition storage area (not shown) in the prediction selector 6m. How set the threshold θ1 will be described later (see FIG. 3).

If it is determined that the above condition represented by expression 10 is satisfied, that is ΣmS0 is smaller than θ1 (YES at step S107), it is determined that prediction is ineffective because DCT coefficient is too small to obtain effects by the prediction. In case of "ineffective", the switch SW1 is turned off, thus, the process for the prediction coding (steps S109 to S111) is skipped. And, the AC components quantized by the quantizer 6e are subjected to variable-length coding (step S108).

If it is determined that the condition represented by expression 10 is not satisfied, that is ΣmS0 is equal to or greater than θ1 (No at step S107), it is further determined whether the prediction is effective or not in the conventional manner (steps S109 to S111). That is, comparing ΣmS0 (the sum of absolute values of unpredicted AC components on the first horizontal line or first vertical column) in every blocks (Y, Cb, and Cr components) in the target block) with ΣmS (the sum of absolute values of the prediction error in the AC components) (steps A7 to A10 shown in FIG. 9). If ΣS0 is larger than ΣmS (ΣmS<ΣmS0; YES at step S110), it is determined that prediction is effective. In this case, the switch SW1 is turned on, thus the prediction error in the AC components are subjected to the variable-length coding (step S111). On the contrary, if ΣmS0 is equal to or smaller than ΣmS (NO at step S110), it is determined that the prediction is ineffective. In this case, the switch SW1 is turned off, thus, unpredicted AC components are subjected to the variable-length coding (step S108).

Since the calculation for obtaining the prediction error in the AC components is skipped if it is determined at step S107 that ΣmS0 is smaller than predetermined threshold θ1, the coding process is carried out efficiently with shorter operation time.

A method of setting the threshold θ1 will now be described.

Figure 9:
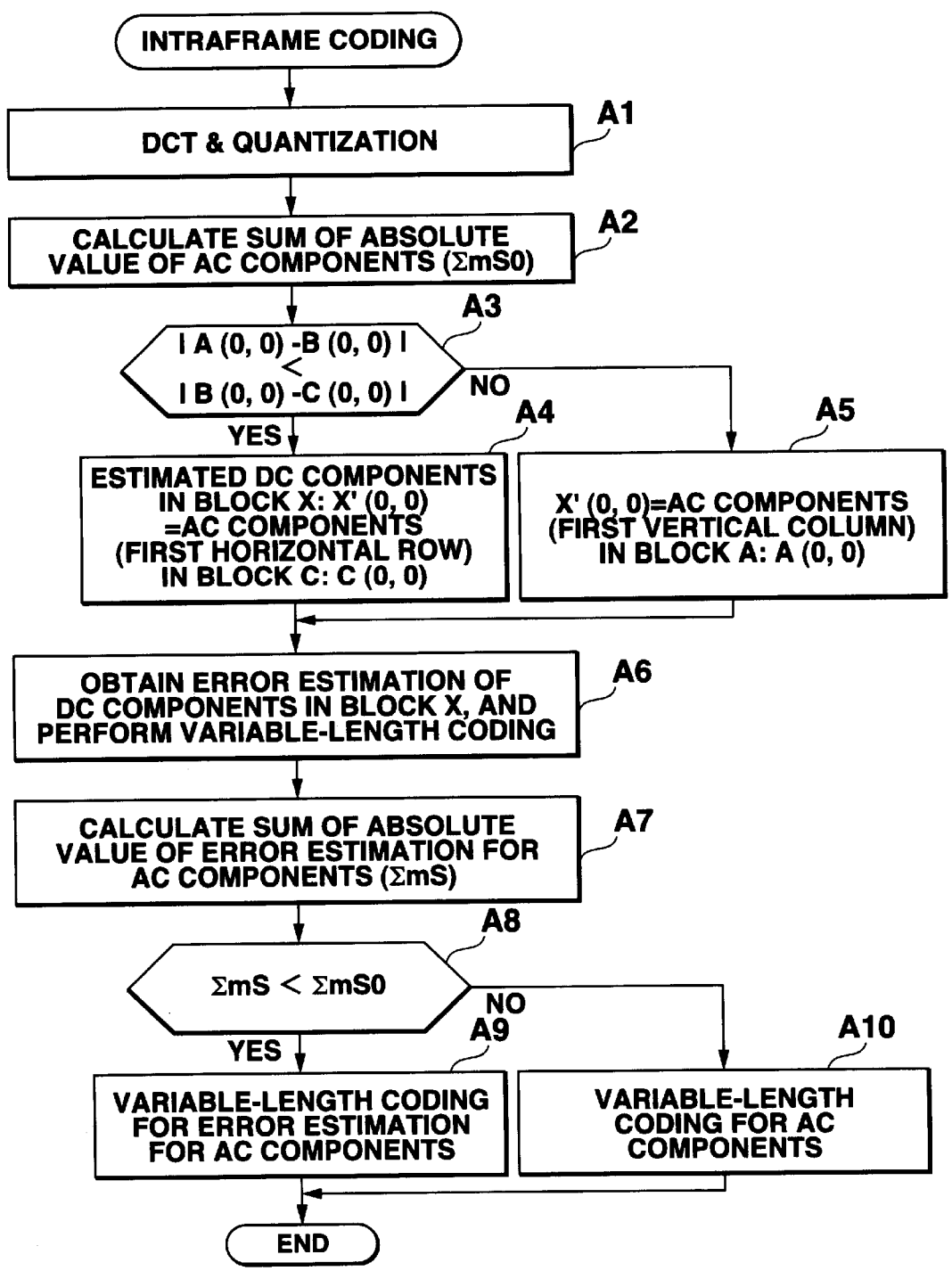
FIG. 9 is a flowchart for explaining the conventional intraframe coding.

For setting threshold θ1, a sample video data set is subjected to the conventional process for determining whether prediction is effective or not (see FIG. 9). That is, all macroblocks in the sample video data to be coded by the intraframe coding are classified by prediction effectiveness: effective or ineffective, while obtaining average and standard deviation of S0 (the sum of absolute values of the AC components) in the macroblocks, which are determined that prediction is effective, in all frames to be coded by the intraframe coding. In the same manner, average and standard deviation of S0 (the sum of absolute values of the AC components) in the macroblocks, which are determined that prediction is ineffective, are obtained.

In this case, threshold θ1 is determined by the following expression 11, where $\alpha_{on}$ represents average and $\sigma_{on}$ represents standard deviation of S0 in case of "effective", while $\alpha_{off}$ represents average and $\sigma_{off}$ represents standard deviation of S0 in case of "ineffective".

$$\theta 1 = (\sigma_{off} \times \alpha_{on} + \sigma_{on} \times \alpha_{off}) / (\sigma_{on} + \sigma_{off}) \qquad \text{EXPRESSION 11}$$

Figure 3:
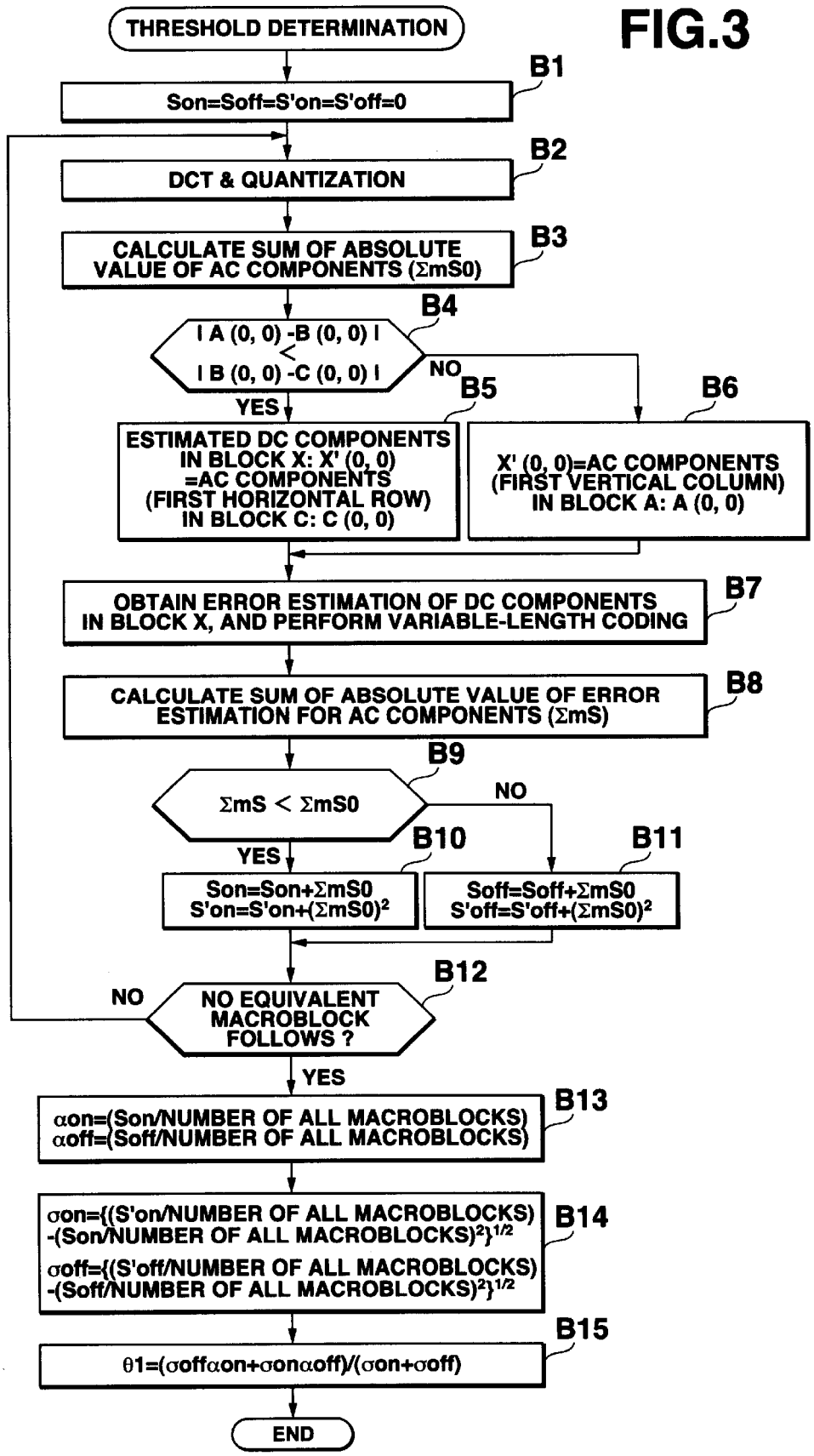
FIG. 3 is a flowchart for explaining process for determining threshold.

FIG. 3 is a flowchart for explaining a method for setting threshold θ1. Threshold θ1 is determined by the process shown in FIG. 3, and determined threshold will be stored in a condition storage area (not shown) in the prediction selector 6m. Operations of the video encoder 1 while setting threshold θ1 will now be described.

The controller 2 sets initial value "0" to registers $S_{on}$, $S_{off}$, $S'_{on}$, and $S'_{off}$ prepared for calculating averages α and standard deviations σ (step B1). As well as performing the conventional coding process, the controller 2 divides arrived test sample video data set into macroblocks to be subjected to DCT individually (step B2) and quantized (step B3). Simultaneously, ΣmS0 (the sum of absolute values of AC components in DCT coefficients on the first vertical column or first horizontal line) is calculated.

Then, prediction coding for DC components is performed. In the same manner as the conventional prediction coding for DC components (steps A3 to A6 shown in FIG. 9), comparison of the difference in DC components between blocks A and B with the difference in DC components between blocks B and C is carried out (step B4) to determine X'(0, 0) which is prediction value of DC components in a block X (steps B5, B6), and variable-length coding is carried out after calculating the difference (prediction error) between the prediction X'(0, 0) and DC components X(0, 0) (step B7).

Then, ΣmS (the sum of absolute values of the prediction error in the AC components) is calculated (step B8). ΣmS is compared with ΣmS0 obtained at step B3. In a case where ΣmS is smaller than ΣmS0 (YES at step B9), ΣmS0 is added to the register $S_{on}$ ($S_{on}=S_{on}+\Sigma mS0$), while adding the second power of ΣmS0 to the register $S'_{on}$ ($S'_{on}=S'_{on}+(\Sigma S0)^2$) (step B10). In a case where ΣS0 is smaller than ΣmS (NO at step B9), ΣmS0 is added to the register $S_{off}$ ($S_{off}=S_{off}+\Sigma mS0$), while adding the second power of ΣmS0 to the register $S'_{off}$ ($S'_{off}=S'_{off}+(\Sigma mS0)^2$) (step B11).

The above calculations are performed repeatedly until whole macroblocks in the input frames are subjected to the calculation. When the calculations for the last macroblock is finished (YES at step B12), averages and standard deviations are calculated.

Average $\alpha_{on}$ of ΣmS0 in prediction-effective macroblocks is obtained by the following expression 12, while average $\alpha_{off}$ in prediction-ineffective macroblocks is obtained by the following expression 13.

$\alpha_{on}=(S_{on}/$number of all macroblocks$)$      EXPRESSION 12

$\alpha_{off}=(S_{off}/$number of all macroblocks$)$      EXPRESSION 13

Standard deviation $\sigma_{on}$ of ΣmS0 in prediction-effective macroblock is obtained by the following expression 14, while standard deviation $\sigma_{off}$ of ΣmS0 in prediction-ineffective macroblock is obtained by the following expression 15.

$\sigma_{on}=\{(S'_{on}/$number of all macroblocks$)-(S_{on}/$number of all macroblocks$)^2\}^{1/2}$      EXPRESSION 14

$\sigma_{off}=\{(S'_{off}/$number of all macroblocks$)-(S_{off}/$number of all macroblocks$)^2\}^{1/2}$      EXPRESSION 15

Threshold θ1 is obtained by the following expression 16 based on the obtained averages $\alpha_{on}$ and $\alpha_{off}$, and standard deviations $\sigma_{on}$ and $\sigma_{off}$.

$\theta 1=(\sigma_{off}\times\alpha_{on}+\sigma_{on}\times\alpha_{off})/(\sigma_{on}+\sigma_{off})$      EXPRESSION 16

The determined threshold θ1 is stored on the condition storage area (not shown) in the prediction selector 6m, thus, the process for determining threshold θ1 is terminated.

The smaller threshold θ1 becomes, the shorter the process time for coding becomes because the number of "prediction-effective" blocks reduces. On the contrary, the larger threshold θ1 becomes, the longer the process time for coding becomes, because redundant tasks increases though exact coding is realized.

According to the first embodiment described above, condition whether AC components prediction is ineffective or not based on obtained value (ΣmS0: the sum of absolute values of unpredicted AC components) is examined before calculating ΣmS (the sum of absolute values of prediction error in AC components). Then, it is determined whether the condition (ΣmS0<θ) is satisfied or not. In a case where ΣmS is smaller than threshold θ1, it is determined that prediction before coding is ineffective. In this case, calculation of prediction error in AC components is skipped, and unpredicted AC components are directly subjected to the variable-length coding. If the condition is not satisfied, it is determined whether prediction is effective or not in the same manner in the conventional coding process.

According to the first embodiment as described above, calculation of prediction error (ΣmS) is skipped in a case where it is obvious that prediction is ineffective for the frame under coding process, for example, frames representing almost uniform images such as the sky and the ground. The omission of calculating the prediction error helps to reduce process time for coding thus the efficiency improves. Moreover, since it is determined whether the prediction is effective or not by combination of examining the condition before calculating prediction error and the conventional determining method, the result will be exact.

Second Embodiment

A video data encoder 1 according to a second embodiment will now be described.

In the above first embodiment, the effectiveness of prediction is determined based on ΣmS0 (the sum of absolute values in AC components). In the second embodiment, the number of AC components whose absolute value is not 0 in DCT coefficients on the first vertical column or first horizontal line is counted (count value S1). The effectiveness of prediction will be determined based on the size of ΣmS1 (the sum of the count values S1). The count value S1 is obtained by the following expression 17.

Figure 4:
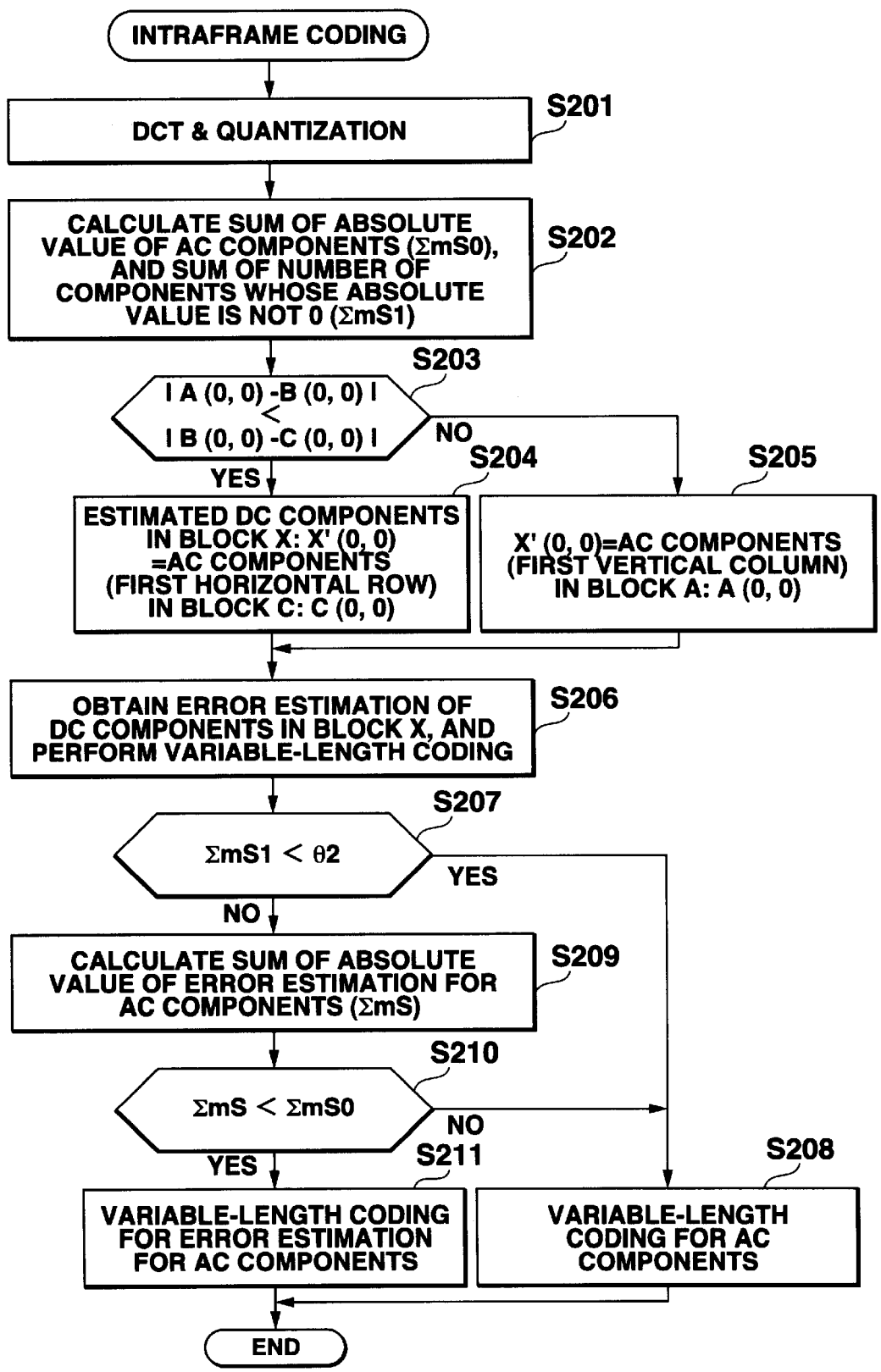
FIG. 4 is a flowchart for explaining intraframe coding according to a second embodiment.

$S1=\Sigma u(|X(i,0)|)$ or $\Sigma u(|X(0,j)|)(i,j=1, 2, \ldots, 7)$      EXPRESSION 17 where u(X) is a unit step function $u(X) = 1 (X \neq 0)$ $\phantom{u(X)} = 0 (X = 0)$ Operations for intraframe coding according to the second embodiment will now be described with reference to FIG. 4. FIG. 4 is a flowchart for explaining the intraframe coding according to the second embodiment.

Since the structure of the video data encoder 1 according to the second embodiment is the same as that in the first embodiment, description of the device structure will be omitted with using the same reference characters. Since also the coding process is almost the same as that described in the first embodiment expect process for determining effectiveness of prediction, detailed description regarding to the coding process will also be omitted.

After DCT, quantization, and prediction coding for DC components (steps S201 to S206), the video CODEC 6 starts to encode AC components. In the second embodiment, a predetermined condition for determining whether AC component prediction is ineffective is examined before calculating prediction error ΣmS of the AC components. The condition here is whether ΣmS1 (the sum of the numbers of the AC components (see FIG. 17) whose absolute value is not 0 in the DCT coefficients on the first vertical column of first horizontal line in all blocks (Y, Cb, and Cr components) in macrobrocks) is smaller than a predetermined threshold θ2. That is, it is determined whether the following expression 18 is satisfied or not.

$\Sigma mS1<\theta 2$      EXPRESSION 18

θ2 represents threshold which is optimized in accordance with desired video image quality after coding, process rate of coding, and the like. The threshhold θ2 is previously stored in the condition storage area (not shown) in the prediction selector 6m. A method for determining the threshhold θ2 will be described later.

If the condition represented by the above expression 18, that is, ΣmS1 (the sum of count values) is smaller than threshold θ2 (YES at step S207), it is determined that AC component prediction is ineffective because the frames may represent almost uniform images. In this case, the switch SW1 is turned off, thus the prediction process (steps S209 to S211) is skipped. Then, the AC components quantized by the quantizer 6e are subjected to the variable-length coding (step S208).

If the condition is unsatisfied on the contrary (NO at step S207), it is determined whether the prediction is effective or not in the conventional manner (steps S209 to S211).

The method for determining the threshold θ2 will now be described.

The threshhold θ2 is determined in the same manner as the method for determining θ1 described in the first embodiment (see FIG. 3). That is, the threshold θ2 is determined by the following expression 19.

$$\theta 2 = (\sigma'_{off} \times \alpha'_{on} + \sigma'_{on} \times \alpha'_{off})/(\sigma'_{on} + \sigma'_{off}) \quad \text{EXPRESSION 19}$$

In the above expression, $\alpha'_{on}$ and $\sigma'_{on}$ represent average and standard deviation of S1 in prediction-effective macroblock respectively, while $\alpha'_{off}$ and $\sigma'_{off}$ represents the same in prediction-ineffective macroblock.

The flowchart shown in FIG. 3 may be modified as another for explaining a process flow of θ2 determination just by replacing θ1 with θ2; S0 in steps B10 and B11 with S1; and α and σ with α' and σ' respectively.

As well as the case of θ, the smaller θ2 becomes, the shorter the process time for coding is required because the number of prediction-effective blocks reduces. On the contrary, the larger θ2 becomes, the longer the process time is required because redundant tasks include though exact coding is realized.

According to the second embodiment as described above, the condition for determining whether the prediction is ineffective or not is examined based on previously obtained value (in this case, the number of AC components whose absolute value is not 0: S1) before calculating ΣmS (the sum of absolute values of prediction error in the AC components). In this case, the condition is ΣmS1 <θ2 (predetermined threshold) or not. If the condition is satisfied, it is determined that prediction is ineffective. In this case, calculation for prediction error is skipped, thus unpredicted AC components are subjected to the variable-length coding directly. If the condition is unsatisfied, it is determined whether the prediction is effective or not in the same manner of the conventional determination shown in FIG. 9.

Accordingly, calculation of prediction error (ΣmS) is skipped in a case where it is obvious that prediction is ineffective for the frame under coding process, for example, frames representing almost uniform images such as the sky and the ground. The omission of calculating the prediction error helps to reduce process time for coding thus the efficiency improves. Moreover, since it is determined whether the prediction is effective or not by combination of examining the condition before calculating prediction error and the conventional determining method, the result will be exact.

Third Embodiment

A video data encoder 1 according to a third embodiment of the present invention will now be described.

In the third embodiment, a condition based on the size of prediction error in DC components is prepared for determining whether AC component prediction is effective or not. The following expression 20 represents the sum of prediction errors (PE) of DC components in all blocks in the macroblocks.

$$PE = \Sigma m |X(0, 0) - X'(0, 0)| \quad \text{EXPRESSION 20}$$

Figure 5:
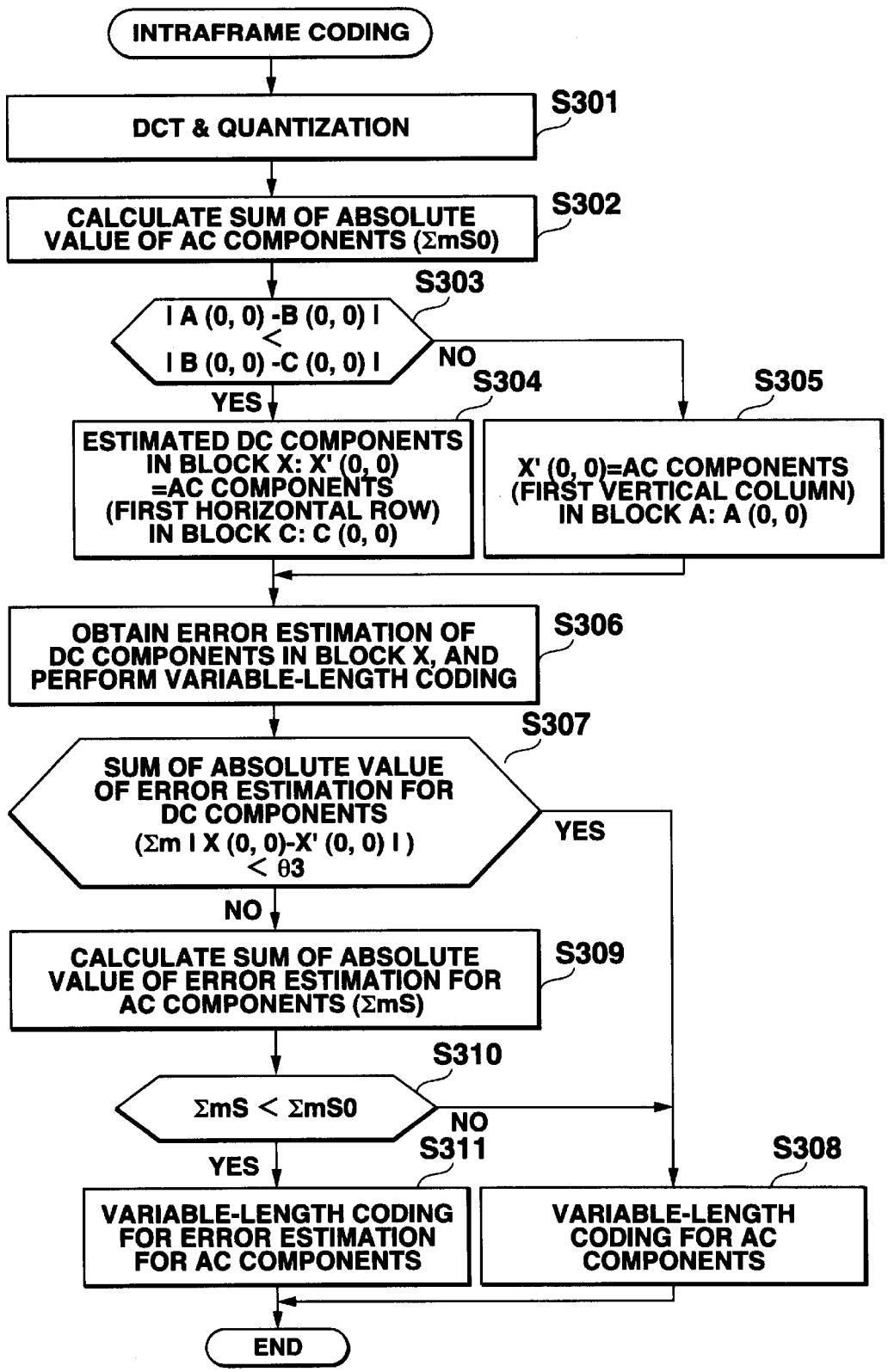
FIG. 5 is a flowchart for explaining intraframe coding according to a third embodiment.

The process of intraframe coding according to the third embodiment will now be described with reference to FIG. 5. FIG. 5 is a flowchart for explaining the intraframe coding according to the third embodiment.

Since the structure of the video data encoder 1 according to the third embodiment is the same as that described in the first embodiment, detailed description will be omitted with using the same reference characters. The coding process is also similar to that described in the first embodiment except determination whether prediction is effective or not, therefore, the coding process will not described in detail.

After arrived video data are subjected to DCT, quantization, and prediction coding for DC components (steps S301 to S306), the video CODEC 6 starts to encode AC components. In the third embodiment, a condition for determining whether the AC component prediction is ineffective or not is examined before calculating prediction error (ΣmS) in the AC components. The condition is that the sum of all blocks (Y, Cb, and Cr components) in the DC component macroblocks obtained at step S306 is smaller than threshold θ3 or not. In other words, it is determined whether the following expression 21 is satisfied or not.

$$\Sigma m |X(0, 0) - X'(0, 0)| < \theta 3 \quad \text{EXPRESSION 21}$$

θ3 represents threshold which is optimized in accordance with desired video quality after encoding, process rate for encoding, or the like, and is previously stored in the condition storage area (not shown) in the prediction selector 6m in the video CODEC 6. A method of determining θ3 will be described later.

If the condition represented by the above expression 21 is satisfied, that is, the sum of DC component prediction error is smaller than θ3 (YES at step S307), it is determined that AC component prediction is ineffective because the frames may represent almost uniform images. In this case, the switch SW1 is turned off, thus, the prediction coding for the AC components (steps S309 to S311) are skipped. And, the AC components quantized by the quantizer 6e are subjected to the variable-length coding (step S308).

If the condition is unsatisfied (NO at step S307), determination whether the prediction is effective or not is carried out in the conventional manner (steps S309 to S311).

A method of determining threshold θ3 will now be described.

Threshold θ3 is determined in the same manner for determining θ1 described in the first embodiment (see FIG. 3). Threshold θ3 is determined by the following expression 22.

$$\theta 3 = (\sigma''_{off} \times \alpha''_{on} + \sigma''_{on} \times \alpha''_{off})/(\sigma''_{on} + \sigma''_{off}) \quad \text{EXPRESSION 22}$$

In the above expression, $\alpha''_{on}$ and $a\sigma''_{on}$ respectively represent average and standard deviation of DC component prediction error in prediction-effective macroblocks, while $\alpha''_{off}$ and $\sigma''_{off}$ and respectively represent those in prediction-ineffective macroblocks.

The flowchart shown in FIG. 3 may be modified as another for explaining a process flow of θ3 determination just by replacing θ1 with θ3; S0 in steps B10 and B11 with DC component prediction error (|X(0, 0)−X'(0, 0)|); and α and σ with α" and σ" respectively.

As well as the case of θ, the smaller θ2 becomes, the shorter the process time for coding is required because the number of prediction-effective blocks reduces. On the contrary, the larger θ2 becomes, the longer the process time is required because redundant tasks include though exact coding is realized.

According to the third embodiment as described above, the condition for determining whether the prediction is ineffective or not is examined based on previously obtained value (in this case, the sum of prediction errors in the DC components:Σm) before calculating ΣmS (the sum of absolute values of prediction error in the AC components). In this case, the condition is $\Sigma m(|X(0, 0)-X'(0, 0)|)<\theta 3$ (predetermined threshold) or not. If the condition is satisfied, it is determined that prediction is ineffective. In this case, calculation for prediction error is skipped, thus unpredicted AC components are subjected to the variable-length coding directly. If the condition is unsatisfied, it is determined whether the prediction is effective or not in the same manner of the conventional determination shown in FIG. 9.

Accordingly, calculation of prediction error (ΣmS) is skipped in a case where it is obvious that prediction is ineffective for the frame under coding process, for example, frames representing almost uniform images such as the sky and the ground. The omission of calculating the prediction error helps to reduce process time for coding thus the efficiency improves. Moreover, since it is determined whether the rediction is effective or not by combination of examining the condition before calculating prediction error and the conventional determining method, the result will be exact.

Various embodiments and changes may be made thereunto without departing from the broad spirit and scope of the invention. For example, prediction error in AC/DC components may employ squared error instead of absolute-value error.

The program or data signal which controls a computer to perform the above functions may be stored in a recording medium such as a ROM, a floppy-disc, a hard disc, a CD-ROM, a MO, a smart media or the like. The program or data signal may be transmitted with a carrier wave.

What is claimed is:

1. A video data encoder which adaptively encodes both direct current components and alternating current components of discrete cosine transform coefficients in target blocks by prediction coding, comprising:

a determination unit which determines whether the prediction for the alternating current components in the target block is effective or not; and an encoder which encodes the alternating current components without calculating prediction error in the alternating current components in the target blocks when said determination unit determines that the prediction is ineffective.

2. A video data encoder which adaptively encodes both direct current components and alternating current components of discrete cosine transform coefficients in target blocks by prediction coding, comprising:

a condition examining unit which examines a predetermined condition which determines that predicting the alternating current components is ineffective, before calculating prediction error in the alternating current components in the target blocks;

a comparator which calculates the prediction error in the alternating current components when said condition examining unit determines that the predetermined condition is unsatisfied, and compares the sum of absolute values of the prediction error in the target blocks with the sum of unpredicted absolute values;

an effectiveness determining unit which determines that the predicting the alternating current components is ineffective when said condition examining unit determines that the predetermined condition is satisfied, or when said comparator results that the sum of the absolute values of the unpredicted alternating current components is smaller than the sum of the absolute values of the prediction error; and an encoder which encodes the alternating current components without calculating the prediction error of the alternating current components in the target blocks, when said effectiveness determining unit determines that the prediction is ineffective.

3. The video data encoder according to claim 2, wherein the predetermined condition includes a condition that the sum of absolute values of the alternating current components within a predetermined range in the target blocks is smaller than a predetermined threshold.

4. The video data encoder according to claim 2, wherein the predetermined condition includes a condition that the number of the alternating current components whose absolute value is not 0 of the alternating current components within a predetermined range in the target blocks is smaller than a predetermined threshold.

5. The video data encoder according to claim 2, wherein the predetermined condition includes a condition that the sum of absolute values of prediction error in direct current components in the target block is smaller than a predetermined threshold.

6. A computer readable recording medium storing a program to be executed by a computer by which said computer has functions of:

means for adaptively encoding both direct current components and alternating current components of discrete cosine transform coefficients in target blocks by prediction coding;

means for determining whether predicting the alternating current components in the target blocks is effective or not; and means for encoding the alternating current components without calculating prediction error of the alternating current components in the target blocks when said determining means determines that the prediction is ineffective.

* * * * *